(12) United States Patent
Song et al.

(10) Patent No.: US 7,899,813 B2
(45) Date of Patent: Mar. 1, 2011

(54) SITUATION-AWARE PATTERN EXTRACTION AND RECOMMENDATION

(75) Inventors: Yu Song, Pleasanton, CA (US); Doreen Cheng, San Jose, CA (US); Sangoh Jeong, Palo Alto, CA (US); Swaroop S. Kalasapur, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 203 days.

(21) Appl. No.: 12/406,792

(22) Filed: Mar. 18, 2009

(65) Prior Publication Data
US 2009/0177689 A1 Jul. 9, 2009

Related U.S. Application Data

(63) Continuation-in-part of application No. 12/041,389, filed on Mar. 3, 2008, application No. 12/406,792, filed on Mar. 18, 2009, which is a continuation-in-part of application No. 12/134,143, filed on Jun. 5, 2008.

(60) Provisional application No. 60/965,963, filed on Aug. 22, 2007, provisional application No. 61/102,839, filed on Oct. 5, 2008.

(51) Int. Cl.
*G06F 7/00* (2006.01)
*G06N 5/02* (2006.01)

(52) U.S. Cl. ........................ 707/723; 706/46
(58) Field of Classification Search ................. 707/723, 707/736, 737; 706/12–14, 45–56
See application file for complete search history.

(56) References Cited

U.S. PATENT DOCUMENTS

| | | | |
|---|---|---|---|
| 6,360,227 B1 * | 3/2002 | Aggarwal et al. | 1/1 |
| 7,174,343 B2 * | 2/2007 | Campos et al. | 707/737 |
| 7,251,637 B1 * | 7/2007 | Caid et al. | 706/15 |
| 2003/0043815 A1 * | 3/2003 | Tinsley et al. | 370/395.21 |
| 2004/0220963 A1 * | 11/2004 | Chen et al. | 707/103 R |
| 2005/0182852 A1 * | 8/2005 | Tinsley et al. | 709/238 |
| 2009/0063537 A1 * | 3/2009 | Bonnefoy-Cudraz et al. | 707/102 |

OTHER PUBLICATIONS

Kenta Oku et al, 2006 IEEE, "Context-Aware SVM context-dependtent Information recommendataion".*

(Continued)

*Primary Examiner*—Hung T Vy
(74) *Attorney, Agent, or Firm*—Beyer Law Group LLP

(57) ABSTRACT

A method for determining user interests is provided, the method comprising: storing data items relating to usage patterns of the user, wherein the data items include an interest portion and a context portion; grouping the data items into context groups, each context group having data items with related context portions; for each context group, determining if the number of data items in the context group is greater than or equal to a first threshold; creating a first partition having context groups having a number of data items greater than or equal to the first threshold; averaging the ratings for interests in the data items in the context groups in the first partition, resulting in each context group in the first partition being a cluster; and deriving a user's interest by comparing a current context to a context group in the first partition.

20 Claims, 11 Drawing Sheets

OTHER PUBLICATIONS

R. Tibshirani, G., Walther, and T., Hastie, "Estimating The Number Of Clusters In A Dataset Via The Gap Statistics", in Journal of Royal Statist. Society, 2001.

L. Kaufman et al., "Finding Groups In Data: An Introduction to Cluster Analysis", Wiley, New York, 1990 (Table of Contents and Chapter 1).

M. Al-Daoud and S. Roberts, "New Methods For The Initialization of Clusters", Technical Report 94.34, School of Computer Science, University of Leeds, 1994.

J. L. Herlocker, J. A. Konstan, A. Borchers and J. Riedl, An Algorithm Framework For Performing Collaborative Filtering, In Proc. of SIGIR 1999.

M. Deshpande and G. Karypis, "Item-Based Top-N Recommendation Algorithms", ACM Trans of Information System, 22(1), pp. 133-151, 2004.

K. Oku, S. Nakajima, J. Miyazaki, S. Uemura, "Context-aware SVM for Context-Dependent Information Recommendation", In Proc. of IEEE MDM'06, 2006.

C. Rack, S. Arbanowski, and S. Steglich, "Context-aware, Ontology-based Recommendation", in Proc. of IEEE SAINTW'06.

Woerndl, W., Groh, G., "Utilizing Physical and Social Context to Improve Recommender Systems" in ACM Web Intelligence and Intelligent Agent Technology Workshops, 2007.

Woerndl, W., Schueller, C., and Wojtech, R., "A Hybrid Recommender System for Context-aware Recommendations of Mobile Applications", in IEEE Data Engineering Workshop, 2007.

Ricci, F., Nguyen, Q. N., "Acquiring and Revising Preferences in a Critique-Based Mobile Recommender System", In IEEE Intelligent Systems, vol. 22, Issue 3, pp. 22-29, 2007.

Zhang, D., Yu, Z., "Spontaneous and Context-aware Media Recommendation in Heterogeneous Spaces", In IEEE Vehicular Technology Conference, 2007.

* cited by examiner

| Time | Location | Temperature | Pop Music | Classical Music |
|------|----------|-------------|-----------|-----------------|
| 100  | 102      | 104         | 106       | 108             |

FIG. 1

| Time Context | | |
|---|---|---|
| Morning | Afternoon | Evening |
| 1 | 2 | 3 |

FIG. 4

| Morning | [1, 0, 0] |
|---|---|
| Afternoon | [0, 1, 0] |
| Evening | [0, 0, 1] |

FIG. 5

| Time (morning, afternoon, evening) | Location (office, home) | Pop music | Classical music |
|---|---|---|---|
| [1, 0, 0] | [1, 0] | x | 5 |
| [0, 0, 1] | [0, 1] | 1 | x |

FIG. 6

| Time (morning, afternoon, evening) | Location (office, home) | Pop music | Classical music |
|---|---|---|---|
| [1, 0, 0] | [1, 0] | x | 4.5 |
| [1, 0, 0] | [0, 1] | 1.25 | x |
| [0, 1, 0] | [1, 0] | 2.33 | x |
| [0, 1, 0] | [0, 1] | 2.76 | x |
| [0, 0, 1] | [1, 0] | x | 0.15 |
| [0, 0, 1] | [0, 1] | x | 1.08 |

SITUATION-AWARE PATTERN EXTRACTION AND RECOMMENDATION

CROSS-RELATION TO RELATED APPLICATIONS

This application is a continuation-in-part of U.S. patent application Ser. No. 12/041,389, entitled "DETERMINING SITUATIONAL PATTERNS OF USE FOR COMPUTING SYSTEMS," filed on Mar. 3, 2008 by Doreen Cheng, Yu Song, Hyuk Cho, Sangoh Jeong, and Swaroop Kalasapur, which claims priority to U.S. Provisional Patent Application No. 60/965,963, entitled "METHOD AND APPARATUS FOR SITUATION-AWARE USER BEHAVIOR PATTERN EXTRACTION", filed on Aug. 22, 2007, by Doreen Cheng, Yu Song, Hyuk Cho, Sangoh Jeong, and Swaroop Kalasapur, both of which are incorporated by reference in their entireties.

This application is also a continuation-in-part of U.S. patent application Ser. No. 12/134,143, entitled "SITUATION-DEPENDENT RECOMMENDATION BASED ON CLUSTERING," filed on Jun. 5, 2008, by Sangoh Jeong, Hyuk Cho, Doreen Cheng, Yu Song, and Swaroop Kalasapur, hereby incorporated by reference in its entirety.

This application also claims priority to U.S. Provisional Patent Application Ser. No. 61/102,839, entitled "SITUATION-AWARE PATTERN EXTRACTION AND RECOMMENDATION," filed on Oct. 5, 2008, by Yu Song, Doreen Cheng, Sangoh Jeong, and Swaroop Kalasapur, herein incorporated by reference in its entirety.

BACKGROUND OF THE INVENTION

1. Field of the Invention

The present invention relates to software applications. More particularly, the present invention relates to the situation-dependent recommendation based on clustering.

2. Description of the Related Art

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power, from the expensive and powerful servers, relatively cheaper Personal Computers (PC's) and laptops, to more inexpensive microprocessors or computer chips provided in storage devices, automobiles, and household electronic appliances.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, a mobile phone or cell phone can be a long-range, portable electronic device used for mobile communication. In addition to the standard voice function of a telephone, current mobile phones can support many additional services such as Short Message Service (SMS) for text messaging, email, packet switching for access to the Internet, and Multimedia Messaging Service (MMS) for sending and receiving photos and video. Most current mobile phones connect to a cellular network of base stations (cell sites), which is in turn interconnected to the public switched telephone network (PSTN) (one exception is satellite phones).

SMS, often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modem standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mail. Its main standardization effort is done by 3GPP, 3GPP2 and Open Mobile Alliance (OMA).

The personalization of the user experience has been a focal point of intensive research in recent years. Personalization offers many advantages. For example, an advertising provider can use personalization techniques to feed advertisements to a user based on his or her personal preferences/interests. An mp3 provider can provide a user with a list of songs that match his or her musical tastes. Other service providers can also provide personalized services to a user based on his or her personal preferences/interests.

Preference, however, is not a static concept. A user's preferences are constantly changing based, in part, upon the current situation in which the user finds him or herself. For example, a user's preferences in his or her office can be very different from when he or she is at home. A common approach to preferences to let the user specify preferences explicitly, in a user profile or similar structure. However, user studies have shown that few users bother to specify preferences and those that do rarely keep those preferences up to date and complete.

SUMMARY OF THE INVENTION

In a first embodiment of the present invention, a method for determining user interests is provided, the method comprising: storing data items relating to usage patterns of the user, wherein the data items include an interest portion having one or more ratings as to the degree of interest the user has for one or more interests and a context portion having information as to the context to which the ratings pertain; grouping the data items into context groups, each context group having data items with related context portions; for each context group, determining if the number of data items in the context group is greater than or equal to a first threshold; creating a first partition having context groups having a number of data items greater than or equal to the first threshold; averaging the ratings for interests in the data items in the context groups in the first partition, resulting in each context group in the first partition being a cluster; and deriving a user's interest by comparing a current context to a context group in the first partition.

In a second embodiment of the present invention, a method for determining user interests is provided, the method comprising: storing data items relating to usage patterns of the user, wherein the data items include an interest portion having one or more ratings as to the degree of interest the user has for one or more interests and a context portion having information as to the context to which the ratings pertain; grouping the data items into context groups, each context group having data items with related context portions; for each context group, determining if the number of data items in the context group is greater than or equal to a first threshold; creating a first partition having context groups having a number of data items greater than or equal to the first threshold; averaging the ratings for interests in the data items in the context groups in the first partition, resulting in each context group in the first partition being a cluster; and deriving a user's interest by comparing a current context to a context group in the first partition.

In a third embodiment of the present invention, an apparatus is provided comprising: an interface; and one or more processors configured to: store data items relating to usage patterns of the user, wherein the data items include an interest portion having one or more ratings as to the degree of interest the user has for one or more interests and a context portion having information as to the context to which the ratings pertain; group the data items into context groups, each context group having data items with related context portions; for each context group, determine if the number of data items in the context group is greater than or equal to a first threshold; create a first partition having context groups having a number of data items greater than or equal to the first threshold; average the ratings for interests in the data items in the context groups in the first partition, resulting in each context group in the first partition being a cluster; and derive a user's interest by comparing a current context to a context group in the first partition.

In a fourth embodiment of the present invention, an apparatus is provided comprising: an interface; and one or more processors configured to: store data items relating to usage patterns of the user, wherein the data items include an interest portion having one or more ratings as to the degree of interest the user has for one or more interests and a context portion having information as to the context to which the ratings pertain; group the data items into context groups, each context group having data items with related context portions; for each context group, determine if the number of data items in the context group is greater than or equal to a first threshold; create a first partition having context groups having a number of data items greater than or equal to the first threshold; average the ratings for interests in the data items in the context groups in the first partition, resulting in each context group in the first partition being a cluster; and derive a user's interest by comparing a current context to a context group in the first partition.

In a fifth embodiment of the present invention, a system for determining user interests is provided, the system comprising: means for storing data items relating to usage patterns of the user, wherein the data items include an interest portion having one or more ratings as to the degree of interest the user has for one or more interests and a context portion having information as to the context to which the ratings pertain; means for grouping the data items into context groups, each context group having data items with related context portions; means for, for each context group, determining if the number of data items in the context group is greater than or equal to a first threshold; means for creating a first partition having context groups having a number of data items greater than or equal to the first threshold; means for averaging the ratings for interests in the data items in the context groups in the first partition, resulting in each context group in the first partition being a cluster; and means for deriving a user's interest by comparing a current context to a context group in the first partition.

In a sixth embodiment of the present invention, a system for determining user interests is provided, the system comprising: means for storing data items relating to usage patterns of the user, wherein the data items include an interest portion having one or more ratings as to the degree of interest the user has for one or more interests and a context portion having information as to the context to which the ratings pertain, wherein the context portion includes context values pertaining to time of day; means for grouping the data items into context groups, each context group having data items with related context portions; means for, for each context group, determining if the number of data items in the context group is greater than or equal to a first threshold; means for creating a first partition having context groups having a number of data items greater than or equal to the first threshold; means for averaging the ratings for interests in the data items in the context groups in the first partition, resulting in each context group in the first partition being a cluster; means for, for context groups in the first partition, filtering out a context group from the first partition if it has a number of statistically significant average ratings below a second threshold, wherein an average rating is statistically significant if it is based upon a number of data items greater than or equal to a third threshold; and means for deriving a user's interest by comparing a current context to a context group in the first partition.

In a seventh embodiment of the present invention, a program storage device readable by a machine tangibly embodying a program of instructions executable by the machine to perform a method for determining user interests is provided, the method comprising: storing data items relating to usage patterns of the user, wherein the data items include an interest portion having one or more ratings as to the degree of interest the user has for one or more interests and a context portion having information as to the context to which the ratings pertain; grouping the data items into context groups, each context group having data items with related context portions; for each context group, determining if the number of data items in the context group is greater than or equal to a first threshold; creating a first partition having context groups having a number of data items greater than or equal to the first threshold; averaging the ratings for interests in the data items in the context groups in the first partition, resulting in each context group in the first partition being a cluster; and deriving a user's interest by comparing a current context to a context group in the first partition.

In an eighth embodiment of the present invention, a program storage device readable by a machine tangibly embodying a program of instructions executable by the machine to perform a method for determining user interests is provided, the method comprising: storing data items relating to usage patterns of the user, wherein the data items include an interest portion having one or more ratings as to the degree of interest the user has for one or more interests and a context portion having information as to the context to which the ratings pertain, wherein the context portion includes context values pertaining to time of day; grouping the data items into context groups, each context group having data items with related context portions; for each context group, determining if the number of data items in the context group is greater than or equal to a first threshold; creating a first partition having context groups having a number of data items greater than or equal to the first threshold; averaging the ratings for interests in the data items in the context groups in the first partition, resulting in each context group in the first partition being a cluster; for context groups in the first partition, filtering out a context group from the first partition if it has a number of statistically significant average ratings below a second threshold, wherein an average rating is statistically significant if it is based upon a number of data items greater than or equal to a third threshold; and deriving a user's interest by comparing a current context to a context group in the first partition.

BRIEF DESCRIPTION OF THE DRAWINGS

FIG. 1 is a diagram illustrating an example vector storing context and interest information for a single data point in accordance with an embodiment of the present invention.

FIG. 4 is a diagram illustrating an example of a context set in accordance with an embodiment of the present invention.

FIG. 5 is a diagram illustrating an example of context encoding in accordance with an embodiment of the present invention.

FIG. 6 is a diagram illustrating an example of an instance vector in accordance with an embodiment of the present invention.

FIG. 7 is a diagram illustrating an example of grouped instance data in accordance with an embodiment of the present invention.

DETAILED DESCRIPTION OF SPECIFIC EMBODIMENTS

Figure 2:
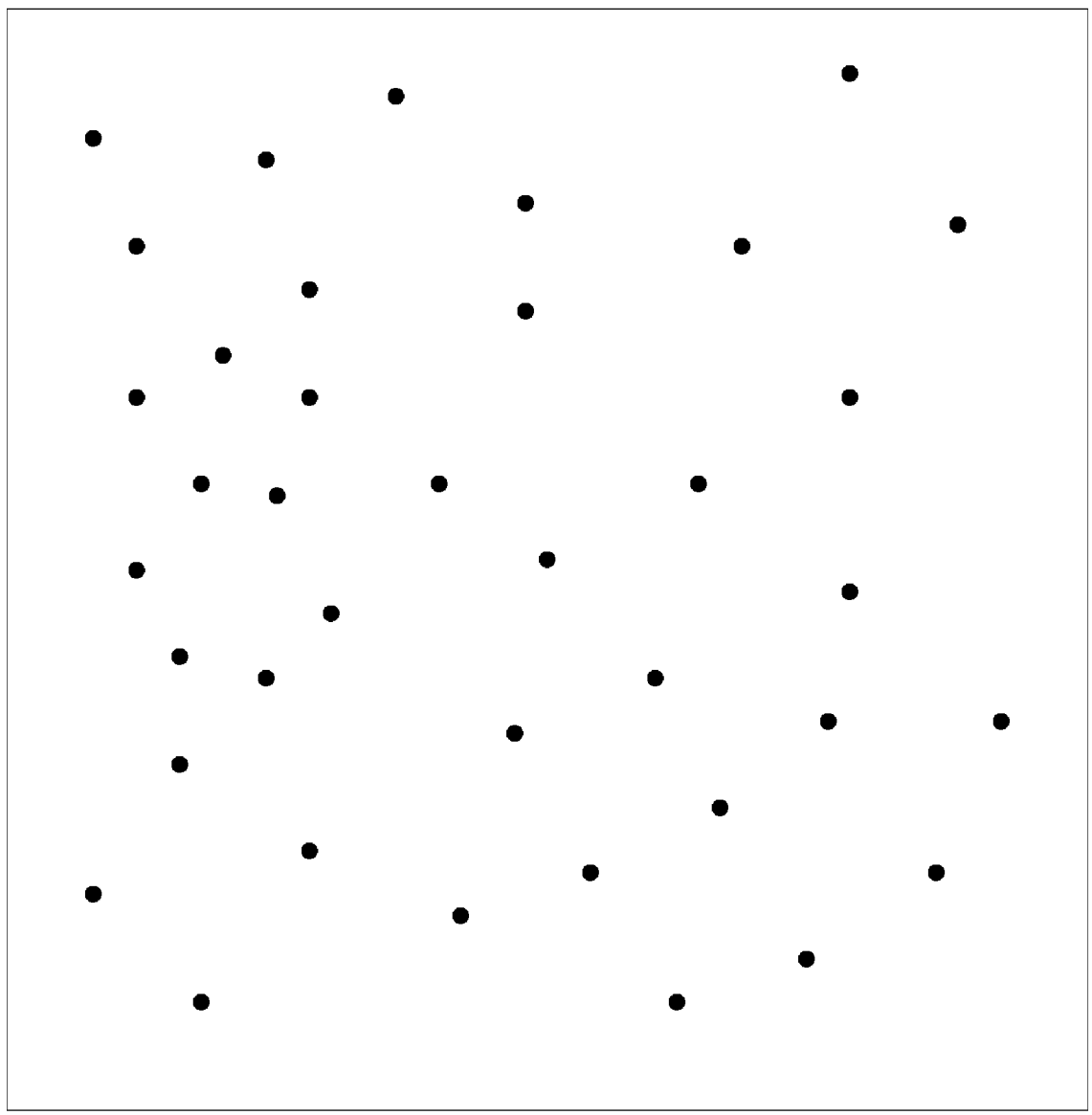
FIG. 2 is a diagram illustrating an example graph in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, software applications or other items may be automatically recommended to the user based on data related to the current context and past usage information. Context refers to the situation in which the user and/or device the user is operating. For example, the context may include the location of the user—whether the user is home, at the office, or elsewhere. The context may also include the time of day—for example, whether it is morning, afternoon, or evening. One of ordinary skill in the art will recognize that there may be many other types of information captured by the context and nothing in this document shall be read as limiting the invention to any particular type of information.

One way for a system to provide preferences would be to let a user specify his or her preferences, and use the preferences to guide application/service recommendations. For example, a user may indicate a preference for business-related software, and the system may use this information to err on the side of recommending business-related software applications when asked. Thus, for example, if the choice is between a game application and a word processing application, the system would recommend a word processing application.

Other approaches require the user to effectively train the device over a period of time ("supervised training"). However, supervised training may not be an ideal or a desired solution for many applications as it requires the use to spend a significant amount of time and effort to actively train the device. Another drawback is that conventional approaches are not flexible and do not readily adapt to changes in preferences, environment, or habits associated with the use of the device. Therefore, improved techniques for enhancing mobile devices and/or their use are needed.

As such, in an embodiment of the present invention, preference information for a user is computed under a current context by using the user's preferences from other contexts.

Data relating to previous usage information may be collected and stored as data points. The data point information may be stored in vectors. FIG. 1 is a diagram illustrating an example vector storing context and interest information for a single data point in accordance with an embodiment of the present invention. In this example, context information includes time 100, location 102, and temperature 104. Interest information indicates the interest of a user in one or more objects of interest, including pop music 106 and classical music 108.

Each data point may also be visualized as a point on a two-dimensional graph. FIG. 2 is a diagram illustrating an example graph in accordance with an embodiment of the present invention. The proximity of data points to one another on the graph indicates the level of similarity of their vectors. In an embodiment of the present invention, these data points may be grouped into clusters of similar data points. Clustering is the classification of objects into different groups, or more precisely, the partitioning of a data set into subsets (clusters), so that the data in each subset (ideally) share some common trait - often proximity according to some defined distance measure. These clusters may then be utilized in aiding the system select appropriate applications to recommend.

Figure 3:
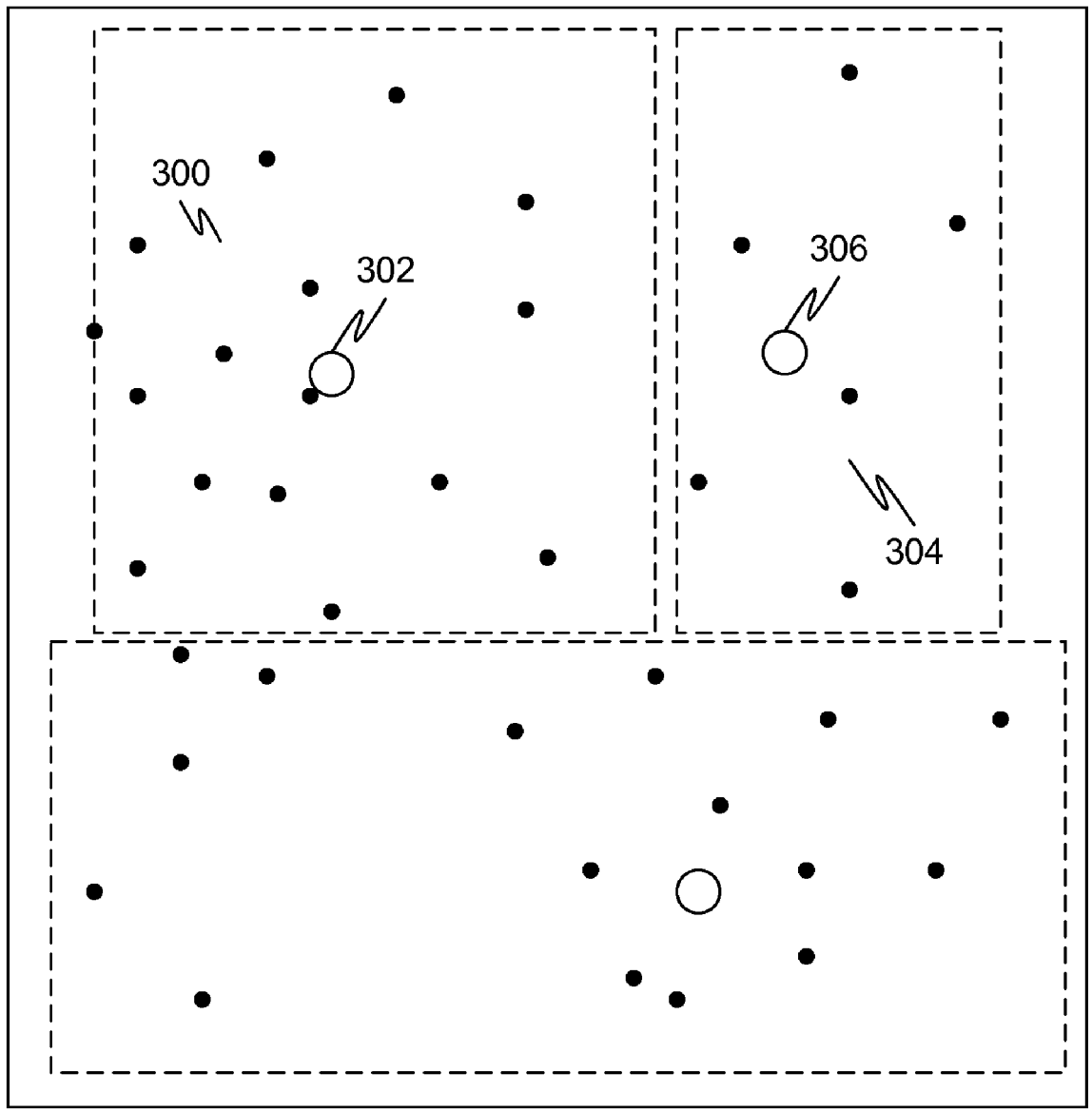
FIG. 3 is an example of the graph with the data points clustered in accordance with an embodiment of the present invention.

One way to cluster the data points is to attempt to determine the optimum number of clusters for a given set of data points. This optimum number is known as k. There are a number of traditional techniques for making this determination, all of which are beyond the scope of this application. There are numerous drawbacks to this approach, however. K must be determined dynamically, and as such requires significant processing power, processing power that may be lacking in mobile devices. Additionally, k can be very difficult to determine with any degree of accuracy, and an incorrect guess can negatively impact both the clustering and recommendation accuracy. Given the partitioned clusters, one way to extract patterns is to compare the current data point with each of the cluster centroids and determine to which cluster the current data point belongs. The interest patterns are then extracted from this cluster. For n-dimensional structures, a centroid is an intersection of all hyperplanes that divide X into two parts of equal moment about the hyperplane. Informally, it is the "average" or "mean" of all points of X. Thus, a centroid of a cluster is the mean of all points in the cluster. FIG. 3 is an example of the graph with the data points clustered in accordance with an embodiment of the present invention. Cluster 300 has centroid 302 and Cluster 304 has centroid 306.

In contrast to clustering, another way to extract patterns is to group neighboring data points nearest to the current data point. The nearest neighbors are those that are most similar to the current contexts and interests. The interest patterns are then extracted from these neighboring instances. This approach, however, requires that all of the existing data points be compared in order to find the neighbors, and thus is also not suitable for online computation on resource-limited devices such as mobile In an embodiment of the present invention, a user's preferences are indicated by ratings provided for various keywords. For example, if the user has a strong interest in classical and rock music, then the keywords "classical music" and "rock music" may be given high ratings. In one embodiment, the ratings are integer values between 0 and 5, with 0 indicating no interest and 5 indicating very strong interest. It is assumed for the moment that the user rates only a few keywords, leaving the majority of keywords without ratings.

Given contexts and interest ratings stored in a log, this information may first be vectorized. For a context type, a 1-in-N encoding may be utilized, meaning that if the context type has one of N values, the context type is represented with a vector of size N. The position of the vector is set corresponding to the value to be 1 for the occurring context and the rest to be 0. FIG. 4 is a diagram illustrating an example of a context set in accordance with an embodiment of the present invention. Here, the possible time contexts (morning, afternoon, evening) are shown with their corresponding values (1, 2, and 3, respectively).

Figure 5:
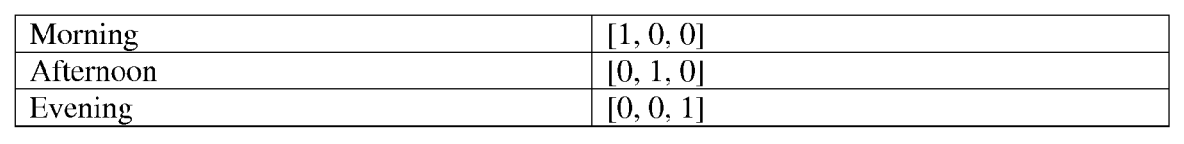

FIG. 5 is a diagram illustrating an example of context encoding in accordance with an embodiment of the present invention. Here, "morning", "afternoon," and "evening" are encoded into vectors containing 3 items.

For each keyword in an instance vector, an "x" may be used to denote that the user has not rated the keyword, and 0-5 used to indicate the interest level of the user on the keyword if he has rated it. FIG. 6 is a diagram illustrating an example of an instance vector in accordance with an embodiment of the present invention. Here, the user, while at the office in the morning, has rating classical music with a "5" and has not rated pop music. Additionally, while at home in the evening, the user has rating pop music with a "1" and has not rated classical music.

Given the encoded data, the entire log is encoded using a combination of context values. For example, all instances of "morning,office" are grouped into one vector and all instances of "morning,home" are grouped into another vector. During grouping, the ratings on each keyword are combined by computing the average rating on a keyword (ignoring x's, i.e., ignoring instances of "no rating"). FIG. 7 is a diagram illustrating an example of grouped instance data in accordance with an embodiment of the present invention.

The purpose of the grouping step is to find out patterns based on statistical significance. For example, if there are lots of data instances in a context group, it can be concluded that a statistically meaningful contextual pattern can be extracted from this context group. A first threshold can then be used to assign the context groups into two partitions. One partition contains those context groups whose number of data instances exceeds or is equal to the threshold. The other partition contains the context groups whose number of data instances fall below the threshold. As an example, if the first threshold is set at 5, then the first partition contains context groups that have 5 or more data instances. It should be noted that the first threshold may either be set by an administrator or may be dynamically set, for example, by an application at runtime.

As was stated earlier, the rating data ultimately contains valid ratings as well as missing ratings. For these missing ratings, they must be treated as unknown. If there are only a few valid ratings for a particular interest, then the system cannot conclude any reliable rating pattern for that interest, even though the number of data instances in the group exceeds the first threshold. Therefore, it may be necessary to further filter the context groups. For each context group in the first partition, the average rating value for a keyword is computed from valid ratings for the keyword from all data instances in the context groups. Then the number of average ratings in the group is computed. If the number of average ratings is below a second threshold, then the number of ratings in the context group does not have statistical significance.

Furthermore, for each average rating, the system should consider from how many valid ratings it is averaged. This is because if the average rating is computed from an insufficient number of valid ratings, the average rating value is of no statistical significance either. Thus, a third threshold is defined—the minimum number of valid ratings needed in order for an average rating to be statistically significant.

By using all three of the thresholds, the instances are whittled down to the most likely instances to be able to extract meaningful interest patterns. This "meaningful partition" would be limited to context groups where the number of data instances in the group exceeds the first threshold, the number of average ratings in the group exceeds the second threshold, based only on average ratings from ratings having a number of valid ratings exceeding the third threshold.

The context states and average ratings in the selected context groups (i.e., in the first partition) are then used as the initial centroids for context states and ratings. Thus, the initial k value is equal to the number of identifiable patterns of statistical significance (i.e., the number of context groups in the first partition). The rest of the data instances in the other context groups (i.e., in the second partition) are assigned based on these initial groups. The other data instances may be known as "outliers."

The outliers may be assigned to a context group in the first partition by computing the Euclidean distance between its context states and the context states of each of the existing context groups (in the first partition). The one with the minimum Euclidean distance would be the context group to which the new data instance should be assigned. Once it is assigned, the assigned context group can update its context states centroid by incorporating the newly assigned data instance.

Once the instances have all been assigned, the rating centroids of the context group can be updated by recomputing the average rating value for each keyword from all data instances in the group.

In another embodiment of the present invention, rather than attempt to place the outliers into existing clusters, a new "outlier cluster" is simply formed containing all of the outliers. This embodiment has the advantage or requiring less computing power to perform.

When it is time to derive a user's preferences under the current context, first the current context is obtained. Then the 1-N encoding is used to convert the current context to an encoded context. The current encoded context is then compared with each cluster context centroid. The cluster that has the smallest distance from current context to cluster centroid is used, and the selected cluster's rating centroid is then used as the user's preferences.

When a new data instance arrives (e.g., when the user indicates a new preference), the system can attempt to place the new data instance into an existing cluster. If there are enough data instances in this existing cluster that can be grouped with the new data instance, it may be possible to split the cluster into two. In one embodiment, this is performed in a single iteration. However, embodiments are foreseen wherein the examination of the existing clusters is performed iteratively so that some or even all the assumptions made during the initial cluster computation are re-examined. In this extreme, for example, the system may completely reperform the entire clustering algorithm each time a new data instance is received.

Figure 8:
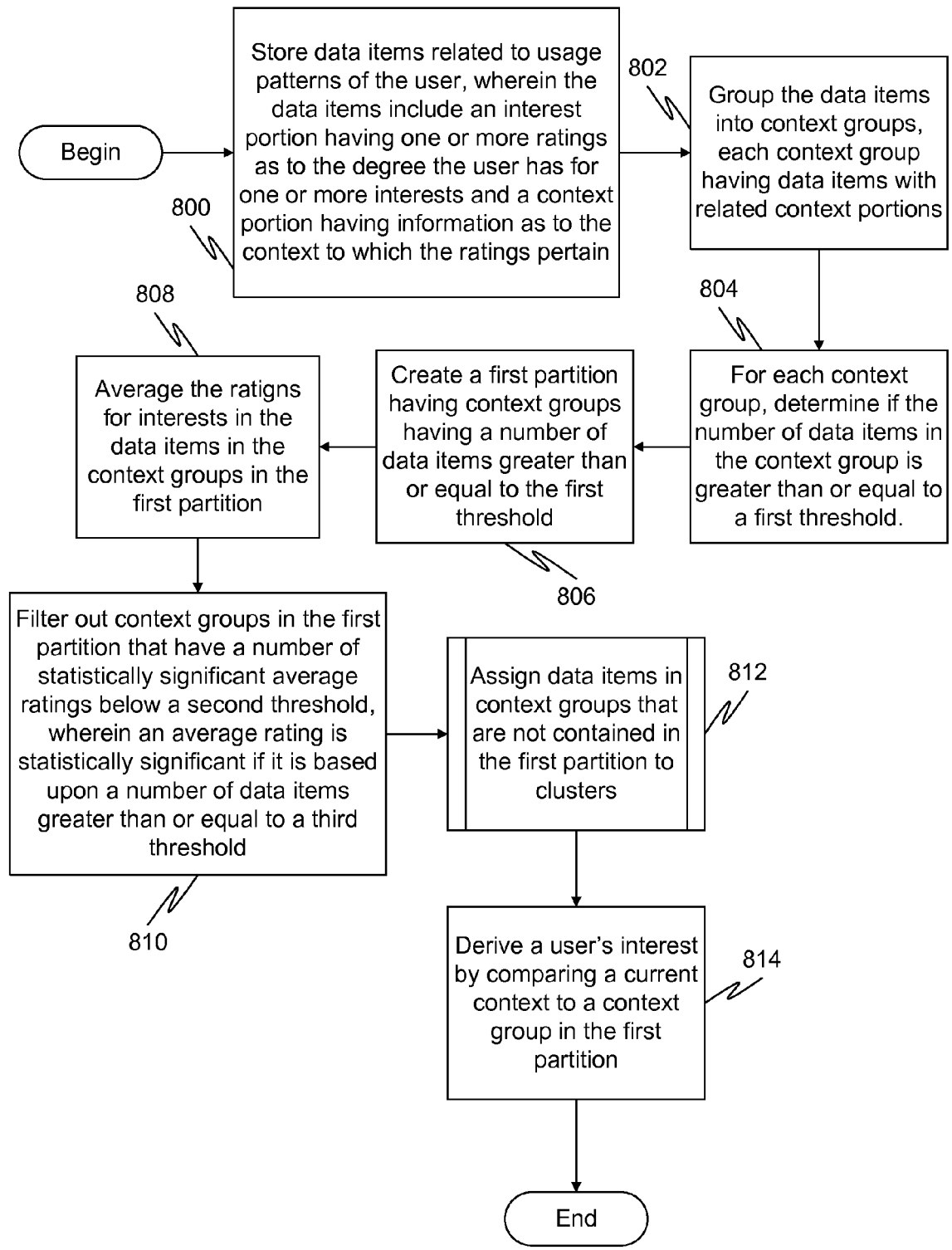
FIG. 8 is a flow diagram illustrating a method for determining user interests in accordance with an embodiment of the present invention.

FIG. 8 is a flow diagram illustrating a method for determining user interests in accordance with an embodiment of the present invention. At 800, data items related to usage patterns of the user are stored, wherein the data items include an interest portion having one or more ratings as to the degree of interest the user has for one or more interests and a context portion having information as to the context to which the ratings pertain. At 802, the data items are grouped into context groups, each context group having data items with related context portions. Context portions of data items are "related" if they have at least one context value in common. At 804, for each context group, it is determined if the number of data items in the context group is greater than or equal to a first threshold. At 806, a first partition is created having context groups having a number of data items greater than or equal to the first threshold. At 808, the ratings for interests in the data items in the context groups in the first partition are averaged, resulting in each context group in the first partition being a cluster. At 810, a context group is filtered out of the first partition if it has a number of statistically significant average ratings below a second threshold, wherein an average rating is statistically significant if it is based upon a number of data items greater than or equal to a third threshold. At 812, data items in context groups that are not contained in the first partition (either by not being placed there originally at 806 or by being filtered out at 810) are assigned to clusters. This will be described in more detail below. At 814, a user's interest is derived by comparing a current context to a context group in the first partition. This may include determining the closest cluster by determining the Euclidean distance between centroids of the clusters and the current context. The average ratings in the closest cluster may then be used to recommend interests that are likely to have value to the user.

Figure 9:
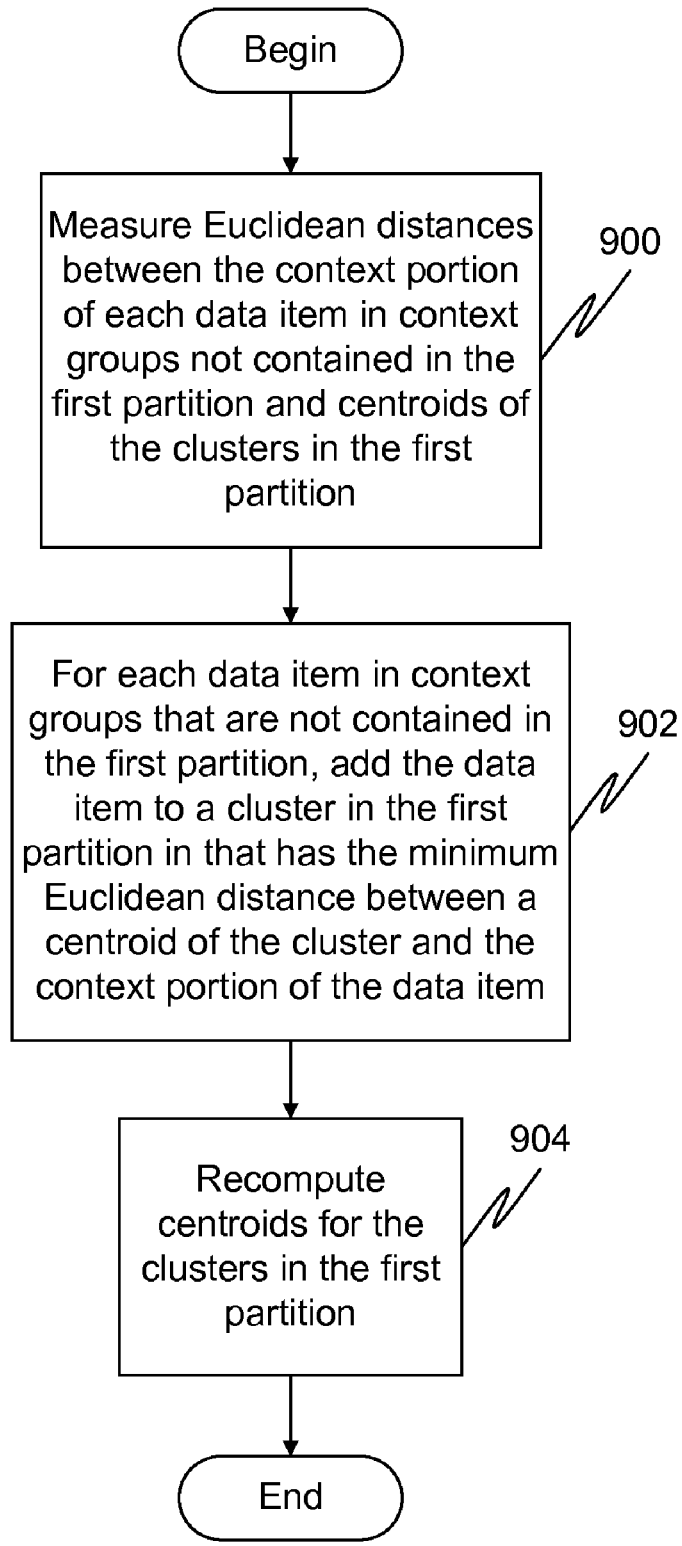
FIG. 9 is a flow diagram illustrating a method for assigning data items in context groups that are not contained in the first partition in accordance with an embodiment of the present invention.

FIG. 9 is a flow diagram illustrating a method for assigning data items in context groups that are not contained in the first partition in accordance with an embodiment of the present invention. This figure depicts one way to handle step 812 of FIG. 8. At 900, the Euclidean distances between the context portion of each data item in context groups that are not contained in the first partition and centroids of the clusters in the first partition are measured. At 902, for each data item in context groups that are not contained in the first partition, the data item is added to a cluster in the first partition that has the minimum Euclidean distance between a centroid of the cluster and the context portion of the data item. At 904, centroids for the clusters in the first partition are recomputed.

Figure 10:
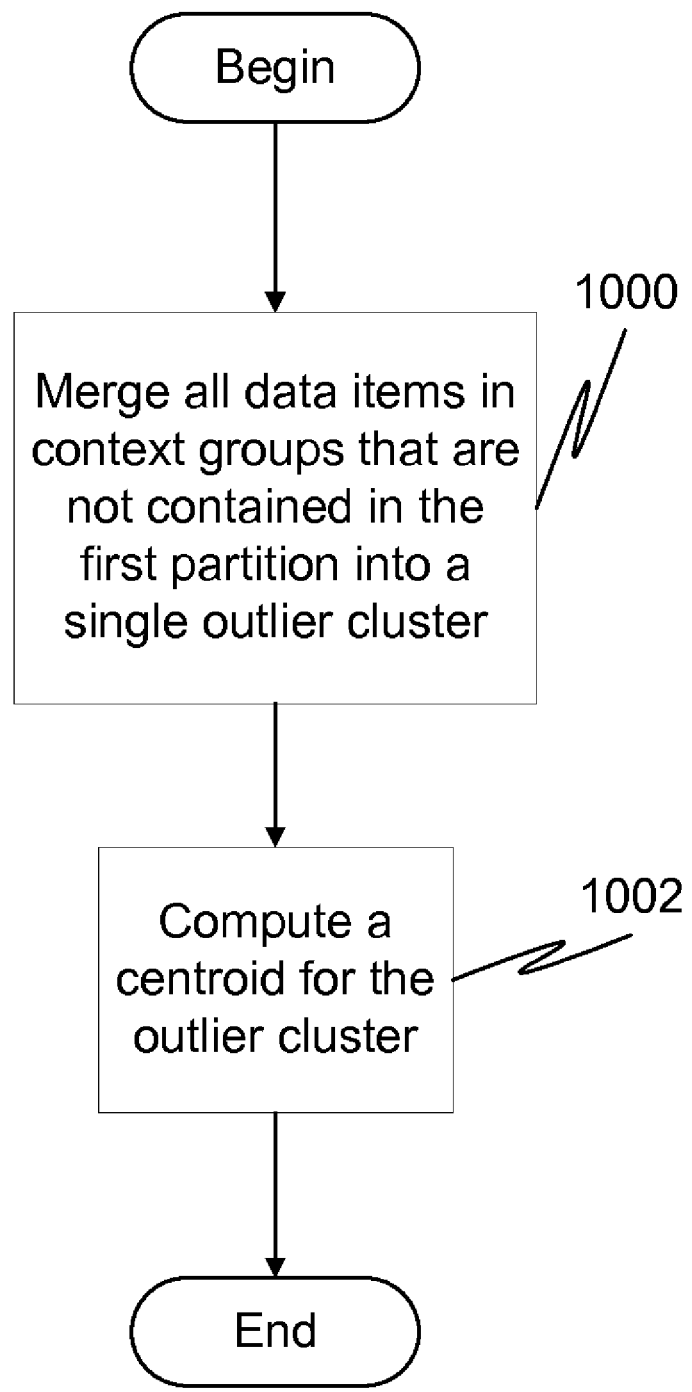
FIG. 10 is a flow diagram illustrating a method for assigning data items in context groups that are not contained in the first partition in accordance with another embodiment of the present invention

FIG. 10 is a flow diagram illustrating a method for assigning data items in context groups that are not contained in the first partition in accordance with another embodiment of the present invention. This figure depicts another way to handle step 812 of FIG. 8. At 1000, all data items in context groups that are not contained in the first partition are merged into a single outlier cluster. At 1002, a centroid is computed for the outlier cluster.

Figure 11:
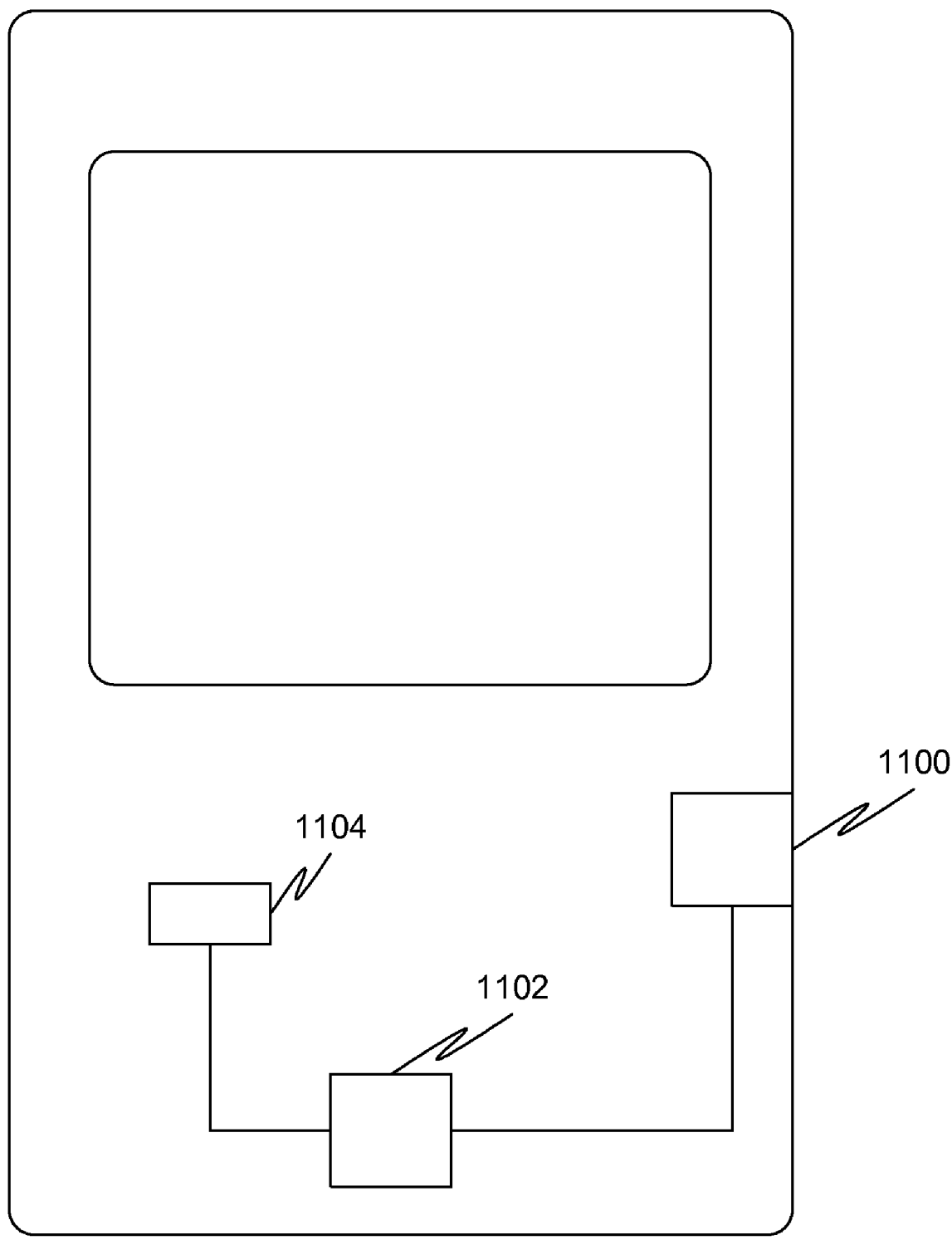
FIG. 11 is a block diagram illustrating a system in accordance with an embodiment of the present invention.

FIG. 11 is a block diagram illustrating a system in accordance with an embodiment of the present invention. In this diagram the system is a mobile device. One of ordinary skill in the art will recognize, however, that the system may be embodied in many different devices or in groups of devices. For example, the system may comprise a mobile device having a processor that performs some of the recited steps and also comprise a server that performs other of the recited steps. In another example, the system may comprise a desktop computer.

The system may include an interface 1100 and one or more processors 1102. The processors may be configured to perform some or all of the steps recited in FIGS. 8-10 and the corresponding text above. Additionally, when the system includes a mobile device, it may include a load detection module 1104. The load detection module may detect the load level of processor 1102 (i.e., how busy the processor is). In such a case, the one or more processors may then be configured to perform the storing, and clustering, and determining when the device is not being used or is lightly used and to perform the selecting, computing, and recommending when the actual recommendation is requested by a user.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for determining user interests, the method comprising:
    storing data items relating to usage patterns of the user, wherein the data items include an interest portion having one or more ratings as to the degree of interest the user has for one or more interests and a context portion having information as to the context to which the ratings pertain;
    grouping the data items into context groups, each context group having data items with related context portions;
    for each context group, determining if the number of data items in the context group is greater than or equal to a first threshold;
    creating a first partition having context groups having a number of data items greater than or equal to the first threshold;
    averaging the ratings for interests in the data items in the context groups in the first partition, resulting in each context group in the first partition being a cluster; and
    deriving a user's interest by comparing a current context to a context group in the first partition.

2. The method of claim 1, further comprising:
    for context groups in the first partition, filtering out a context group from the first partition if it has a number of statistically significant average ratings below a second threshold, wherein an average rating is statistically significant if it is based upon a number of data items greater than or equal to a third threshold.

3. The method of claim 1, further comprising:
    encoding the data items into vectors.

4. The method of claim 3, wherein each of the encoded vectors includes a context portion and an interest portion, wherein the interest portion contains a list of keywords and one or more ratings corresponding to the keywords.

5. The method of claim 1, further comprising:
    creating a second partition having context groups having a number of data items greater than or equal to the first threshold; and
    for each data item in a context group in the second partition, adding the data item to a cluster in the first partition that has the minimum Euclidean distance between a centroid of the cluster in the first partition and the context portion of the data item.

6. The method of claim 1, further comprising:
    creating a second partition having context groups having a number of data items greater than or equal to the first threshold; and
    merging all context groups in the second partition into a single outlier cluster.

7. The method of claim 5, further comprising:
    recomputing centroids for each of the clusters in the first partition after the data item is added to a cluster in the first partition.

8. The method of claim 1, further comprising:
    receiving a new data item;
    placing the new data item in a cluster in the first partition; and
    splitting the cluster in which the new data item is placed if the cluster now contains enough data items to have two clusters that have a number of data items greater than or equal to the first threshold.

9. The method of claim 1, wherein each context portion has one or more context values, each context value representing a description of a characteristic related to a state in which the usage pattern pertains.

10. A method for determining user interests, the method comprising:
    storing data items relating to usage patterns of the user, wherein the data items include an interest portion having one or more ratings as to the degree of interest the user has for one or more interests and a context portion having information as to the context to which the ratings pertain, wherein the context portion includes context values pertaining to time of day;
    grouping the data items into context groups, each context group having data items with related context portions;
    for each context group, determining if the number of data items in the context group is greater than or equal to a first threshold;
    creating a first partition having context groups having a number of data items greater than or equal to the first threshold;
    averaging the ratings for interests in the data items in the context groups in the first partition, resulting in each context group in the first partition being a cluster;
    for context groups in the first partition, filtering out a context group from the first partition if it has a number of statistically significant average ratings below a second threshold, wherein an average rating is statistically significant if it is based upon a number of data items greater than or equal to a third threshold; and
    deriving a user's interest by comparing a current context to a context group in the first partition.

11. An apparatus comprising:
    an interface; and
    one or more processors configured to:
        store data items relating to usage patterns of the user, wherein the data items include an interest portion having one or more ratings as to the degree of interest the user has for one or more interests and a context portion having information as to the context to which the ratings pertain;
        group the data items into context groups, each context group having data items with related context portions;
        for each context group, determine if the number of data items in the context group is greater than or equal to a first threshold;
        create a first partition having context groups having a number of data items greater than or equal to the first threshold;
        average the ratings for interests in the data items in the context groups in the first partition, resulting in each context group in the first partition being a cluster; and
        derive a user's interest by comparing a current context to a context group in the first partition.

12. The apparatus of claim 11, wherein the apparatus is a mobile device.

13. A system for determining user interests, the system comprising:

means for storing data items relating to usage patterns of the user, wherein the data items include an interest portion having one or more ratings as to the degree of interest the user has for one or more interests and a context portion having information as to the context to which the ratings pertain;

means for grouping the data items into context groups, each context group having data items with related context portions;

means for, for each context group, determining if the number of data items in the context group is greater than or equal to a first threshold;

means for creating a first partition having context groups having a number of data items greater than or equal to the first threshold;

means for averaging the ratings for interests in the data items in the context groups in the first partition, resulting in each context group in the first partition being a cluster; and means for deriving a user's interest by comparing a current context to a context group in the first partition.

14. The system of claim 13, further comprising:

means for, for context groups in the first partition, filtering out a context group from the first partition if it has a number of statistically significant average ratings below a second threshold, wherein an average rating is statistically significant if it is based upon a number of data items greater than or equal to a third threshold.

15. The system of claim 13, further comprising:

means for creating a second partition having context groups having a number of data items greater than or equal to the first threshold; and means for, for each data item in a context group in the second partition, adding the data item to a cluster in the first partition that has the minimum Euclidean distance between a centroid of the cluster in the first partition and the context portion of the data item.

16. The system of claim 15, further comprising:

means for recomputing centroids for each of the clusters in the first partition after the data item is added to a cluster in the first partition.

17. The system of claim 13, further comprising:

means for creating a second partition having context groups having a number of data items greater than or equal to the first threshold; and means for merging all context groups in the second partition into a single outlier cluster.

18. The system of claim 13, further comprising:

means for receiving a new data item;

means for placing the new data item in a cluster in the first partition; and means for splitting the cluster in which the new data item is placed if the cluster now contains enough data items to have two clusters that have a number of data items greater than or equal to the first threshold.

19. The system of claim 13, wherein each context portion has one or more context values, each context value representing a description of a characteristic related to a state in which the usage pattern pertains.

20. A program storage device readable by a machine tangibly embodying a program of instructions executable by the machine to perform a method for determining user interests, the method comprising:

storing data items relating to usage patterns of the user, wherein the data items include an interest portion having one or more ratings as to the degree of interest the user has for one or more interests and a context portion having information as to the context to which the ratings pertain;

grouping the data items into context groups, each context group having data items with related context portions;

for each context group, determining if the number of data items in the context group is greater than or equal to a first threshold;

creating a first partition having context groups having a number of data items greater than or equal to the first threshold;

averaging the ratings for interests in the data items in the context groups in the first partition, resulting in each context group in the first partition being a cluster; and deriving a user's interest by comparing a current context to a context group in the first partition.

* * * * *